June 4, 1968 H. FUNFSTUCK 3,386,498
TEMPERATURE CONTROL SYSTEM
Filed Feb. 18, 1966 3 Sheets-Sheet 2

Fig. 2

HORST FUNFSTUCK
INVENTOR.

BY
KENDRICK, SUBKOW & STOLZY
ATTORNEYS

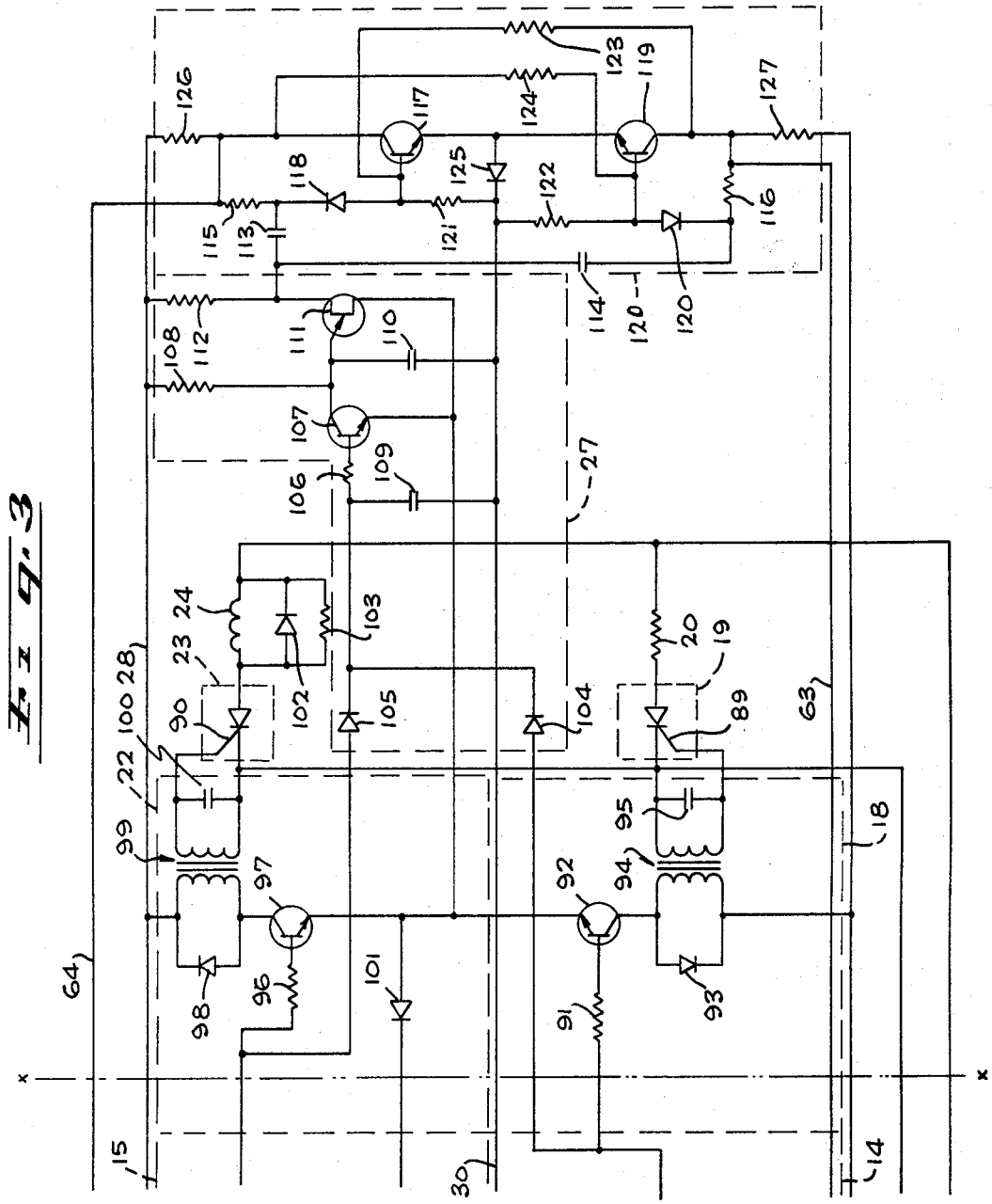

United States Patent Office 3,386,498
Patented June 4, 1968

3,386,498
TEMPERATURE CONTROL SYSTEM
Horst Funfstuck, Los Angeles, Calif., assignor to Statham Instruments, Inc., Los Angeles, Calif., a corporation of California
Filed Feb. 18, 1966, Ser. No. 528,488
5 Claims. (Cl. 165—26)

ABSTRACT OF THE DISCLOSURE

A confined region, the temperature of which is to be controlled, includes a heater, a cooler and a temperature sensor, the latter providing an electric signal functionally related to the temperature of the region. Individual silicon controlled rectifiers are inserted in serial relation to the heater and a control device for the cooler. Each SCR is individually controlled by a one-shot (monostable) multivibrator, the input of which requires the simultaneous presence of a signal from the temperature sensor of prescribed value, a synchronizing pulse and a biasing level signal, the latter being provided to either the heater or cooler circuit as required. The biasing signal is provided on switching from either heating to cooling or vice versa after a time delay.

---

This invention relates to apparatus for maintaining a variable at an approximately constant level or at a level within certain desired upper and lower limits, and more particularly to controls both to increase and to decrease the magnitude of the variable.

Although the device of the present invention may have application in fields other than those disclosed herein, it has been found especially useful in controlling the temperature of an environmental chamber. However, the invention is not to be limited to this application.

In the past, it has been the practice to select heating or cooling of a test chamber manually by means of a selector switch in combination with a set-point dial, thermostat or similar control. Further, prior art systems have disadvantages because overheating can cause a hazard to industrial personnel or damage to equipment because of control device failures.

It is therefore an object of the present invention to provide means for heating or cooling a chamber and for keeping the temperature within predetermined upper and lower limits.

It is another object of the invention to provide an adjustable fail-safe or temperature limiting device in an environmental chamber which prevent overheating.

It is still another object of the invention to provide an electronic temperature control for an environmental chamber.

It is still a further object of the invention to provide means to disable alternately heating and cooling devices for an environmental chamber so that the chamber will not be heated and cooled at the same time.

In accordance with the system of the present invention, the above-described and other objects of the invention are achieved and the above-described and other disadvantages of the prior art are overcome by providing means to heat a chamber, means to cool it, and control means to disable the heating and cooling means alternately. Thus, by providing both heating and cooling means, the temperature of the chamber may be kept approximately constant and at a value at least within reasonable limits. Further, the control means prevents heating and cooling at the same time. The control means also acts as a protective device in that it keeps the cooling means continually operative in the event the heating means continues to heat through some circuit malfunction. The control means with the cooling means thus guards against overheating. Still further, the system of the present invention may be constructed of stable and reliable electronic components, mechanical or electromechanical devices such as relays not being required.

The above-described and other advantages of the present invention will be better understood from the following description taken in connection with the accompanying drawings.

In the drawings which are to be regarded as merely illustrative:

FIG. 2 is a schematic diagram of a portion of the blocks shown in FIG. 1; and

FIG. 3 is a schematic diagram of the remainder of the blocks shown in FIG. 1.

Figure 1:
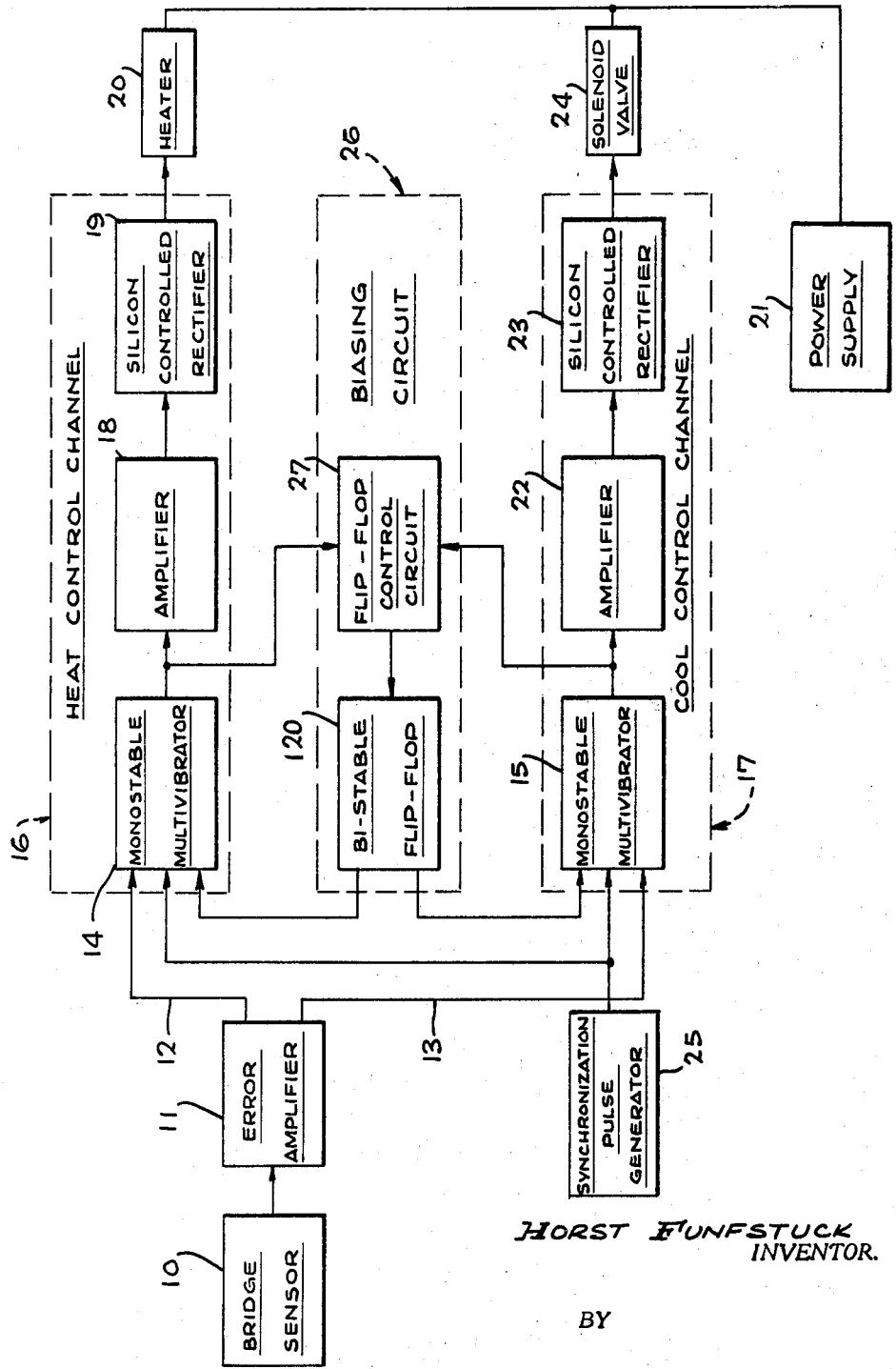
FIG. 1 is a block diagram of the system of the present invention.

In the drawing in FIG. 1, a bridge sensor 10 is provided. As will be explained, the bridge sensor 10 includes several resistors, one of which is known as a Balco wire wound sensor. The Balco wire wound sensor is placed in the environmental chamber. The resistance of the sensor changes in proportion to the change in temperature in the chamber. The bridge also has a potentiometer, as will also be described, which is adjusted to select the temperature in the chamber. The output of bridge 10 is therefore proportional to the difference between the desired temperature of the chamber and its actual temperature.

An error amplifier 11 is provided which has an input from sensor 10. Error amplifier 11 is a differential amplifier. It has two outputs or leads at 12 and 13. The output exceeds a predetermined actuating value. When the temperature in the chamber is too low, the voltage on lead 12 exceeds a predtermined actuating value. When the temperature in the chamber is too high, the potential on lead 13 exceeds a predetermined actuating value.

Amplifier 11 is connected to two monostable multivibrators 14 and 15. Multivibrator 14 is contained in a heating control channel 16. Monostable multivibrator 15 is contained in a cool control channel 17.

An amplifier 18 is connected from multivibrator 14 in heat control channel 16. Silicon controlled rectifier 19 is connected from amplifier 18 in heat control channel 16. Heat control channel 16 controls the current which is passed through a resistance heater 20 by a power supply 21.

An amplifier 22 is connected from multivibrator 15 in cool control channel 17. A silicon controlled rectifier 23 is connected from amplifier 22 in cool control channel 17. Cool control channel 17 operates a solenoid valve 24 which is also supplied power by supply 21.

Heater 20 is positioned in the chamber to heat it. In order to cool the chamber, a quantity of coolant is evaporated within the chamber. This coolant may be carbon dioxide, liquid nitrogen or the like. The coolant which is introduced into the chamber is metered by solenoid valve 24.

Heat control and cool control channels 16 and 17 are also provided with inputs from a synchronization pulse generator 25 and a biasing circuit 26. Biasing circuit 26 includes a flip flop control circuit 27 and a bistable flip flop 120. Circuit 27 receives inputs from the outputs of multivibrators 14 and 15. Bistable flip flop 120 provides an input to each of the multivibrators 14 and 15.

In the operation of the system of the present invention shown in FIG. 1, bridge 10 produces an output signal representative of the difference between the desired chamber temperature and the actual chamber temperature. If the chamber temperature is below the desired temperature, flip flop 120 will be in a state such that it will disable multivibrator 15 and enable multivibrator 14. During the time that multivibrator 15 is disabled, it is prevented from generating output pulses. During the time that multivibrator 14 is enabled, it is capable of producing output pulses.

As stated previously, if the chamber temperature is lower than the desired temperature, bridge 10 will so indicate. Amplifier 11 will then produce a signal on lead 12 which enables multivibrator 14 to generate pulses. During the phase of operation of the system, when the chamber temperature is low, cool control channel 17 is disabled by flip flop 120. However, multivibrator 14 is enabled both by the input thereto from amplifier 11 and the output thereto from flip flop 120. Multivibrator 14 actually generates pulses responsive to its input from pulse generator 25.

Power supply 21 supplies a voltage to heater 20. The passage of current through heater 20 is controlled by silicon controlled rectifier 19.

Silicon controlled rectifier 19 is, in turn, controlled by the output pulses of multivibrator 14 through amplifier 18. Heating takes place until the potential at lead 12 drops to a value sufficient to disable multivibrator 14. As soon as the chamber temperature decreases, the potential at lead 12 increases and the chamber will heat again. In this fashion, the temperature is kept virtually constant.

For a predetermined period, after the generation of the last pulse from multivibrator 14, flip flop 120 does not change states. However, at the termination of this period and if no further heating is required, control circuit 27 applies a pulse to flip flop 120 to change its state. When flip flop 120 changes states, heat control channel 16 is disabled and cool controlled channel 17 is enabled. This happens if the chamber temperature is too high or if the temperature selection dial has been moved to a lower temperature setting.

Due to the fact that the chamber temperature is high, an enabling potential is supplied to multivibrator 15 on lead 13. An enabling potential is also supplied to multivibrator 15 by flip flop 120. Further, multivibrator 15 always receives the output pulse of generator 25. Multivibrator 15 then produces output pulses which are applied to silicon controlled rectifier 23 through amplifier 22. This allows current to pass through solenoid valve 24, which current is supplied by power supply 21. The chamber is then cooled.

When the chamber temperature has reached the desired value, the potential on lead 13 will have decreased and multivibrator 15 will be disabled until the chamber temperature drifts slightly up. The potential on lead 13 will then increase causing the multivibrator 15 to generate pulses which in turn will actuate silicon controlled rectifier 23 and solenoid 24. Thus, as in the case of heating, the chamber will be kept at a constant and safe temperature. If the chamber temperature is too cool because the temperature selection dial has been moved to a higher setting, control circuit 27 will then apply a pulse to flip flop 120 and it will change states. The cycle of heating will then be initiated.

As shown in FIG. 2, power supply 21 has positive output leads 28 and 29, and a negative output lead 30. Power supply 21 has an input transformer 31. Power supply 21 has a rectifier 32, a transistor 33, a Zener diode 34, a resistor 35, and filter capacitors 36 and 37. Rectifier 32 and the collector emitter circuit of transistor 33 are connected in series with negative lead 30. Rectifier 32 is poled to be conductive in a direction toward transformer 31. Filter capacitor 36 is connected between positive output leads 28 and 29 and the collector of transistor 33. Capacitor 37 is connected from the emitter of transistor 33 which is also the negative lead 30 to positive leads 28 and 29. The base of transistor 33 is connected to diode 32 through resistor 35. Diode 34 is connected from the base of transistor 33 to positive leads 28 and 29. This arrangement provides a low ripple, regulated DC voltage of about 20 volts.

Bridge 10 has one arm formed by resistors 38 and 39, and potentiometer 40, all of which are connected in series from lead 28 to lead 30. Resistors 48 and 49 connected in series form the other arm. A resistor 42 connected from the junction of resistors 38 and 39 supplies an input to amplifier 11. Resistor 38 is a Balco wire wound resistor. This resistor is a temperature sensor. The resistance of resistor 38 changes in proportion to temperature in the chamber. Bridge 10 is supplied with about 20 volts DC from power supply 21. The setting of potentiometer 40 determines the temperature at which the chamber is controlled. If the temperature in the chamber is equal to the temperature desired corresponding to the setting of potentiometer 40, the output of bridge 10 will be zero volts in this balanced condition. If the temperature in the chamber is different from that corresponding to the setting of potentiometer 40, an error signal appears across the output of bridge 10.

Amplifier 11 amplifies the output error signal of bridge 10. Amplifier 11 is a two-step differential amplifier. Amplifier 11 has transistors 43 and 44 with common emitters connected to lead 30 through resistor 45. Collector supplies for transistors 43 and 44 are provided by resistors 46 and 47 connected respectively therefrom to leads 28 and 29. Resistors 48 and 49 are serially connected from lead 30 to lead 29. The base of transistor 44 is connected from the junction of resistors 48 and 49. Amplifier 11 has transistors 51 and 52 which have common emitter connections through a resistor 53 connected to lead 30. The bases of transistors 51 and 52 are connected from the collectors of transistors 43 and 44, respectively. Collector supplies for transistors 51 and 52 are provided by resistors 54 and 55, respectively, connected from leads 28 and 29. An output circuit from amplifier 11 is provided by serially connected resistor 56, capacitor 57, capacitor 58 and resistor 59. Resistors 56 and 59 are respectively connected to the collectors of transistors 51 and 52. Amplifier 11 has output leads 60 and 61. The output of amplifier 11 on lead 60 is connected to the input of multivibrator 14. The output of amplifier 11 on lead 61 is connected to the input of multivibrator 15. Multivibrator 14 receives an input through capacitor 57 over a lead 62 from pulse generator 25. Similarly, multivibrator 15 receives output pulses from generator 25 through capacitor 58 over lead 62.

If the temperature inside the test chamber falls below the set value, the output at the collector of transistor 51 is a more positive DC voltage. If the temperature inside the test chamber goes above the set value, the output at the collector of transistor 52 is a more positive DC voltage. These amplified DC voltages are used to actuate the control circuits for heater 20 for heating, and for solenoid valve 24 for cooling. The output of transistor 51 is used only for heater 20. The output of transistor 52 is used only for valve 24. Multivibrators 14 and 15 are employed to generate square waves to trigger silicon controlled rectifiers 19 and 23, respectively. Multivibrators 14 and 15 receive inputs from flip flop 120 on leads 63 and 64, respectively. The input from amplifier 11 to multivibrator 14 is applied to the base of a transistor 65 through a Zener diode 66. The base of transistor 65 is connected to lead 63 by a diode 67 which is poled to be conductive in a direction toward lead 63. The emitter of transistor 65 is connected to lead 30 through a Zener diode 68 in multivibrator 15. A capacitor 69 and a resistor 70 are connected from the base of transistor 65 to lead 30. A transistor 71 is connected from diode 68 to lead 29 through a resistor 72. The base of transistor 71 is connected to lead 29 through a resistor 73. A collector supply for transistor 65 is provided by a resistor 74 connected to lead 29. A capacitor 75 is connected from the collector of transistor 65 to the base of transistor 71. A resistor 76 is connected from the base of transistor 65 to the collector of transistor 71.

In multivibrator 15, a Zener diode 77 is connected from lead 61 to the base of transistor 78. The collector of transistor 78 is connected to lead 28 through a resistor 79. The emitter of transistor 78 is connected to diode 68. A diode 80 is connected from the base of transistor 78 to lead 64 and poled in that direction. A resistor 81 is connected from lead 28 to diode 68. Both a resistor 82 and a capacitor 83 are connected from the base of transistor 78 to lead 30.

A second transistor 84 is provided in multivibrator 15. The collector of transistor 84 is connected to lead 28 through a resistor 85. The emitter of transistor 84 is connected to diode 68. A resistor 86 is connected from lead 28 to the base of transistor 84. A capacitor 87 is connected from the collector of transistor 78 to the base of transistor 84. A resistor 88 is connected from the base of transistor 78 to the collector of transistor 84. Note will be taken that both multivibrators 14 and 15 have a common bias through Zener diode 68. Both multivibrators are in an inactive state unless a signal is applied to their inputs at the bases of transistor 65 or 78.

It will be appreciated that three different signals are applied to the input of each multivibrator 14 and 15. The first is a direct current bias voltage. The second is a synchronization pulse. The third is a gating bias. Each multivibrator will produce a four millisecond drive pulse only on the following conditions. In the first place, the bias voltage which comes from bridge 10 through amplifier 11 must be positive enough to sensitize the multivibrator. Secondly, the synchronization pulse must be present. Thirdly, the bias at the cathode of diode 67 or diode 80 must be positive. Under these conditions, one of the multivibrators will generate a four millisecond pulse for each synchronization applied. The synchronization pulses are produced by generator 25 from the power line at a phase point approximately one millisecond before the line voltage reaches zero volts. Multivibrators 14 or 15, depending on the state of bistable flip flop 120, therefore produces a series of pulses. Each pulse starts one millisecond before the line voltage reaches zero volts and last to a phase point three milliseconds after the line voltage is zero. This assures that the silicon controlled rectifiers 19 and 23 are fired at zero line voltage to reduce radio noise interference and line loading effects. This feature is covered in applicant's copending application Ser. No. 411,266 filed Nov. 16, 1964, for "Silicon Controlled Rectifier Circuit." In the said application, a pulse generator identical to pulse generator 25 is shown and described. Its operation is also described. Reference to the said copending application is therefore hereby made and the said description of the nomenclature and operation thereof is therefore hereby incorporated by this reference thereto in this application.

As stated previously, the output of transistor 51 will be more positive if the temperature inside the chamber decreases below a set value. This information is therefore used to form the biasing of the multivibrator 14 which triggers the circuit of heater 20. In the event that the temperature of the chamber decreases, pulses are generated, amplified by amplifier 18 and fed to the gate 89 of silicon controlled rectifier 19. Silicon controlled rectifier 19, in turn, energizes heater 20. If the correct temperature is reached, silicon controlled rectifier 19 will not be turned on any longer.

Also as described previously, the output of transistor 52 will be more positive if the temperature inside the chamber increases above a set value. This information is therefore used to form the biasing of the multivibrator 15 which triggers the coolant control circuit of valve 24. In case the temperature in the chamber increases, pulses are generated, amplified by amplifier 22 and fed to the gate 90 of silicon controlled rectifier 23. Silicon controlled rectifier 23, in turn, energizes coolant control valve 24. If the correct temperature is reached, silicon controlled rectifier 23 will not be turned on any longer.

In FIG. 3, amplifier 18 is shown including a resistor 91, a transistor 92, a diode 93, a transformer 94 and a capacitor 95. Amplifier 22 includes a resistor 96, a transistor 97, a diode 98, a transformer 99, a capacitor 100 and a diode 101. The emitters of transistors 92 and 97 are connected to Zener diode 68 through diode 101. Resistor 91 connects the collector of transistor 71 to the base of transistor 92. The primary of transformer 94 is connected from the collector of transistor 92 to lead 29. Diode 93 is connected across the primary of transformer 94. Capacitor 95 is connected across the secondary of transformer 94. One side of the capacitor 95 is connected to the cathode of silicon controlled rectifier 19. The other side of capacitor 95 is connected to the gate 89 of silicon controlled rectifier 19. Heater 20 is connected from the anode of silicon controlled rectifier 19 to the power supply.

Resistor 96 connects the collector of transistor 84 to the base of transistor 97. The primary of transformer 99 is connected from lead 28 to the collector of transistor 97. Diode 98 is connected across the primary of transformer 99. Capacitor 100 is connected across the secondary of transformer 99. One side of capacitor 100 is connected to the cathode of silicon controlled rectifier 23. The other side of capacitor 100 is connected to the gate 90 of silicon controlled rectifier 23. Valve 24 is connected from the anode of silicon controlled rectifier 23 to the power supply. A diode 102 and a resistor 103 are connected in parallel with valve 24. Diode 102 and resistor 103 act as a despiking circuit to absorb the energy stored in the solenoid of valve 24.

A second output is taken from multivibrator 14 at the collector of transistor 71 and impressed upon control circuit 27 through a diode 104 therein. Similarly, a second output is taken from multivibrator 15 at the collector of transistor 84 and impressed upon control circuit 27 through a diode 105 therein. Diodes 104 and 105 are connected to an input resistor 106 to the base of a transistor 107. Transistor 107 has a collector supply resistor 108 connected from the collector thereof to lead 28. The emitter of transistor 107 is connected to diode 101 in amplifier 22. The junction of diodes 104 and 105 with resistor 106 is connected to lead 30 through a capacitor 109. A capacitor 110 is connected from the collector of transistor 107 to lead 30. The collector of transistor 107 is connected to the emitter of a unijunction transistor 111. One of the bases of unijunction transistor 111 is connected to lead 28 through a resistor 112. The other base of unijunction transistor 111 is connected to the diode 101 in amplifier 22.

The output of unijunction transistor 111 at its connection with resistor 112 is supplied to flip flop 120 through capacitors 113 and 114. A resistor 115 is connected from capacitor 113 to lead 64. A resistor 116 is connected from capacitor 114 to lead 63. Capacitor 113 is connected to the base of a transistor 117 through a diode 118. The capacitor 114 is connected to the base of a transistor 119 through a diode 120. Resistors 121 and 122 connect the bases of transistors 117 and 119 to lead 30. A resistor 123 connects the base of transistor 117 to the collector of transistor 119. A resistor 124 connects the base of transistor 119 to the collector of transistor 117. The emitters of transistors 117 and 119 are connected to lead 30 through a diode 125. The collector of transistor 117 is connected to lead 28 through resistor 126. The collector of transistor 119 is connected to lead 29 through a resistor 127. Lead 64 is connected to the collector of transistor 117. Lead 63 is connected to the collector of transistor 119.

The basic control principle for heating and cooling depends upon the existence of an error signal produced in the control loop. The temperature in the chamber must deviate slightly. For example, it must deviate approximately 0.05 degree Fahrenheit or more before the amplifier can produce enough error signal to perform the desired control function. This results in minor temperature variation around the control point in positive and negative directions. This could result in heater 20 and valve 24 being turned on and off in a manner such that heater 20 would tend to fight the function of cooling performed by the operation of valve 24. For this reason, circuit 27 and flip flop 120 are provided.

Circuit 27 and flip flop 120 act as an umpire assigning the operating function either to the heating control system or to the cooling control system, but not to both at the same time. This is accomplished by using the pulses obtained at the collectors of transistors 71 and 84. If the chamber is properly controlled, pulses are present on one of these collectors. The pulses generated by multivibrators 14 are passed by diode 104 to cause capacitor 109 to charge to a positive DC voltage. Pulses supplied by multivibrator 15 through diode 105 also cause capacitor 109 to be charged to a positive DC voltage. In case the bistable state of flip flop 120 demands heating and the chamber is too warm, or the state of flip flop 120 demands cooling but the chamber is too cool, no pulses will be present at the output of either one of multivibrators 14 or 15. In this case, the charge of capacitor 109 will slowly disappear by bleeding its current through resistor 106 into the base of transistor 107. As long as capacitor 109 has a charge, the curernt through resistor 106 will maintain transistor 107 in the saturated state maintaining its collector voltage at a low level. However, when capacitor 109 reaches a certain level of discharge, transistor 107 will not be saturated any longer. The collector current will become practically zero and the current through resistor 108 will flow into the emitter of unijunction transistor 111 causing it to produce a pulse. This pulse is fed to the flip flop 120. The flip flop will change state due to the pulse applied. If transistor 117 is saturated and transistor 119 is not, the collector voltage at transistor 117 will be almost 20 volts DC, the power supply voltage. If transistor 119 is saturated, the opposite condition exists.

As stated previously, the collector of transistor 117 is connected through diode 80 to the input of multivibrator 15. If transistor 117 is saturated, the low voltage at its collector will pull the anode of diode 80 to a low voltage inhibiting the cooling channel multivibrator 15. In this case, the multivirator 15 will not produce any output pulses due to the fact that the base of transistor 73 will be biased low. Under this condition, the cooling channel is inoperative, and the chamber can only heat. If transistor 117 is not saturated, its collector voltage is high and the cathode of diode 80 will be positive. This prevents any current flow through diode 80. Under this condition, the cooling channel multivibrator 15 is able to receive control signals at the base of transistor 73 which permits cooling of the chamber.

The collector of transistor 119 is connected through diode 67 to the input of heating channel multivibrator 14. If transistor 119 is saturated, the low voltage at its collector will pull the anode of diode 67 to a low voltage. This inhibits multivibrator 14 because the base of transistor 65 is biased low. Under this condition, the heating channel is inoperative and the chamber can only cool. If transistor 119 is not saturated, its collector voltage is high and the cathode of diode 67 will be positive. This will prevent any current from flowing through diode 67. Under this condition, the heating channel multivibrator 14 is able to receive control signals at the base of transistor 65. This permits the chamber to be heated.

In accordance with the foregoing, it will be seen that the possibility of heating or cooling is determined by biasing circuit 26 consisting of control circuit 27 with an RC time constant, resistor 106, capacitor 109 and bistable flip flop 120 including transistors 117 and 119. The time constant of circuit 27 is about 15 seconds. This is sufficient time to avoid fast jumping between heating and cooling.

From the foregoing, it will be appreciated that sensor 38 of bridge circuit 10 changes resistance in proportion to chamber temperature. When the output of bridge sensor 10 indicates the temperature of the chamber to be higher than the set value, amplifier 11 will amplify this error and pulses from generator 25 will be sufficient to cause multivibrator 15 to produce output pulses to gate silicon controlled rectifier 23 on through amplifier 22. Solenoid valve 24 will then be energized and the chamber will be cooled. At the same time, the output pulse of multivibrator 15 will charge capacitor 109 through diode 105. When the temperature of the chamber has cooled to a sufficient value, the output of sensor 10 will decrease and the output of amplifier 11 will decrease to a value to prevent pulses from operating multivibrator 15. Multivibrator 15 will then terminate its generation of output pulses.

During cooling, flip flop 120 will allow multivibrator 15 to operate. The high potential of the collector of transistor 117 provide a reverse bias for diode 80. After the generation of the last pulse from multivibrator 15, flip flop 120 will not immediately change states. For this reason, for a time multivibrator 14 will be disabled because the collector of transistor 119 will be maintained at a low value. This will bias transistor 65 through diode 67 so that multivibrator 14 will not produce output pulses.

Under normal control conditions, i.e. when cooling is required, multivibrator 15 will produce pulses again as soon as the temperature increases and cooling is required. This will happen well within the 15 second time limit established by circuit 27. For this reason, the chamber temperature is completely controlled by cooling. In case a warmer chamber temperature is required, no pulses will be produced at the output of transistor 84 or transistor 71. Due to this fact, capacitor 109 will no longer be charged. Further, it will discharge. When capacitor 109 has discharged to a certain potential, unijunction transistor 107 will fire and change the stable state of flip flop 120. This will permit multivibrator 14 to produce output pulses to heat the chamber. At the same time, multivibrator 15 will be disabled. Under these conditions the chamber temperature is completely controlled by heating. Generally, it can be said that the chamber temperature will be controlled by heating if the desired chamber temperature is above external (ambient) temperature, and by cooling if the desired chamber temperature is below external (ambient) temperature. As it can be seen from the previous description the chamber control circuit selects its own mode, heating or cooling depending upon the setting of dial potentiometer 40.

Note will be taken that flip flop 120 may be appropriately connected to start the heating and cooling operations. It is to be understood that cooling will always follow heating and that heating will always follow cooling. Thus, flip flop 120 will always disable multivibrator 15 and enable multivibrator 14 when heating is desired. On the other hand, flip flop 120 will enable multivibrator 15 and disable multivibrator 14 when cooling is desired.

It will be appreciated that transistors need not be employed in the circuit of the present invention and that tubes or relays could be substituted therefor. Further, it will be appreciated that conventional component parts may be employed in lieu of those shown in the drawings.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In apparatus for maintaining the temperature of a confined region at a selectively predetermined value, the region being provided with electrically actuated means for cooling and means for heating, and an adjustable temperature sensor located in said region providing an electric signal of magnitude functionally related to the region temperature, the improvement comprising:
- individual gate controlled rectifiers in series with the means for cooling, the means for heating and an electric power source;
- first and second pulse generating means connected to the gates of the gate controlled rectifiers for the means for cooling and the means for heating, respectively;
- a synchronizing pulse generator;
- a bi-stable switching ciricuit fed by the output of the first and second pulse generating means, said switching circuit having output connections to the input of the first and second pulse generating means, said switching circuit providing an actuating signal to the first pulse generating means on receipt of output signals therefrom and providing an actuating signal to the second pulse generating means on receipt of output signals therefrom; and
- individual circuit means at the input of the first and second pulse generating means for cumulatively applying the sensor signal and synchronizing pulses to the respective pulse generating means providing a gating signal to the corresponding gate controlled rectifier upon the simultaneous presentation of a sensor signal of predetermined magnitude, a synchronizing pulse and an actuating signal at the input of the pulse generating means.

2. In apparatus for maintaining the temperature of a confined region as in claim 1, in which the bi-stable switching circuit includes means for delaying provision of actuating signals on command switching from one pulse generating means to another.

3. In apparatus for maintaining the temperature of a confined region as in claim 1, in which the first and second pulse generating means each include a monostable multivibrator and a pulse amplifier for providing pulse signals of such magnitude as to gate the rectifier means.

4. In apparatus for maintaining the temperature of a confined region as in claim 1, in which the bi-stable switching circuit includes a flip-flop having a pair of input terminals and corresponding output terminals, and an RC control signal generator connected to receive the output from the first and second generating means and to provide signals to a corresponding one of the input terminals of the flip-flop, whereby the associated output terminal of the flip-flop is brought to the enabling condition, while the other flip-flop terminal is brought to the disabling condition, effecting mutually exclusive operation of the first and second pulse generating means.

5. In apparatus for controlling the temperature of a restricted space, the space being provided with electrically actuatable cooling means and heating means and a selectively adjustable temperature sensor responsive to the space temperature for generating electric signals, the magnitudes of which signals are proportional to the region temperature, the improvement comprising:
- a pair of solid state devices each of which is arranged in respective serial relation between a power supply and the heating and cooling means, each of said devices having a control electrode which on being energized places the device in a high conductive state and when de-energized in a high impedance state;
- first and second cyclic signal generating means connected respectively to the control electrodes of the devices;
- a synchronizing pulse generator;
- a switching circuit actuated by the condition of the cyclic generating means for providing a pair of signals to the inputs of the cyclic generating means, one signal enabling and one disabling; and
- summing circuit means at the input of the cyclic generating means for summing signals from the sensor, synchronizing pulse generator and the switching circuit such that when all three are present, the associated cyclic generating means is actuated and the other is disabled.

References Cited
UNITED STATES PATENTS

| | | | |
|---|---|---|---|
| 2,761,655 | 9/1956 | Lunden et al. | 165—12 |
| 2,926,005 | 2/1960 | Jones | 165—26 |
| 3,243,609 | 3/1966 | Kompelein | 165—26 |
| 3,254,838 | 6/1966 | Chambers | 165—27 |
| 3,292,687 | 12/1966 | Evans | 165—26 |

ROBERT A. O'LEARY, *Primary Examiner.*

CHARLES SUKALO, *Examiner.*